Feb. 20, 1962     W. ENGI     3,021,984

SPOUT CONSTRUCTION FOR COFFEE MILLS AND THE LIKE

Filed Jan. 25, 1960

INVENTOR.

Walter Engi

BY

Patent Agent

United States Patent Office 3,021,984
Patented Feb. 20, 1962

3,021,984
SPOUT CONSTRUCTION FOR COFFEE MILLS
AND THE LIKE
Walter Engi, Zurich, Switzerland, assignor to
Adolf Ditting, Zurich, Switzerland
Filed Jan. 25, 1960, Ser. No. 4,256
Claims priority, application Switzerland Jan. 23, 1959
7 Claims. (Cl. 222—196)

This invention relates to a grinding mill and more particularly to a spout construction of a coffee mill.

A first object of the present invention is the provision of means which permits the conveying of ground coffee from the grinding discs of the mill to a container, such as a paper bag, with a minimum amount of the ground coffee particles being retained in the spout.

A further object of the invention is the provision of means in a spout construction of a grinder which prevent the ground coffee or any other ground material from adhering to the internal walls as a result of electrostatic charge.

A further object of the invention is to provide a single means operable by one hand to fasten a bag in position to receive ground material from a grinder and to set a tube of the spout in vibration.

Figure 1:
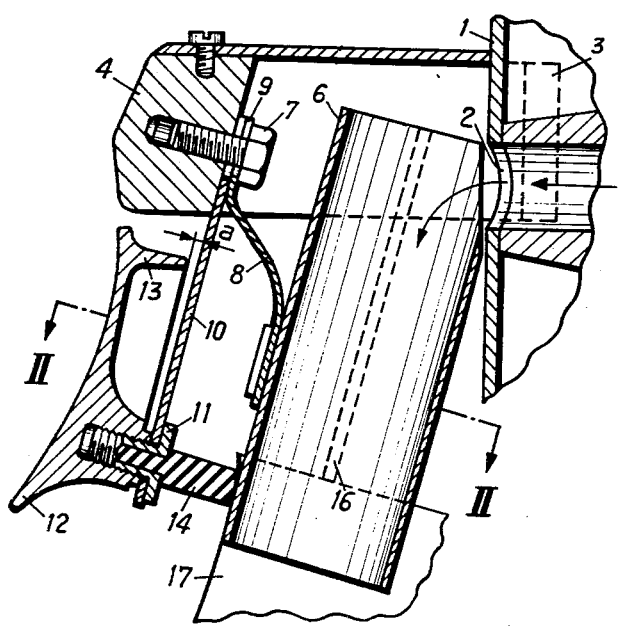
Figure 2:
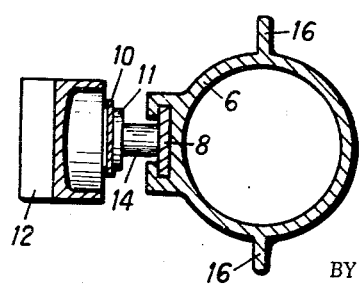

These and other objects of the invention will become more apparent from the following description, taken in connection with the accompanying drawings in which:

FIG. 1 shows a longitudinal cross-section through a spout channel of a coffee mill, FIG. 2 shows a section along the line II—II of FIG. 1.

In FIG. 1, the housing wall 1 of a coffee mill has a bore 2 through which the ground coffee is discharged as it leaves the grinding discs of the mill. Fitted to the housing wall 1, by means of flanges 3, is a holder 4 or support for the spout channel or tube 6. Fitted to the holder 4 by means of a screw 7 is a resilient first spring 8 which carries the tube 6. The upper end of the spring 8 has a slot 9, permitting the span or working length of the spring 8 to be adjusted.

Held preferably by the same screw 7 is a second spring 10 which may also consist, preferably, of several superimposed laminated sheets. The spring 10 is also slotted at its upper end, thus permitting the span or working length of the spring to be adjusted as with the spring 8. Fitted to the lower end of the spring 10, by a screw 11, is a handle 12. The upper end of this handle 12 presents a transverse rib 13 directed towards the leaf spring 10 which, in its rest position, is a short distance from the spring 10. When the handle 12 is moved by hand clockwise—with reference to the drawing—the rib will engage the leaf spring 10. The securing screw 11 is provided with a bore into which an extension portion or a hammer 14, preferably made of rubber or soft plastic material, is inserted. The spring 10 is prestressed to such a degree that the hammer 14 in its rest position is pressed against the tube 6.

As shown in FIG. 2, the tube 6 is supported solely by the spring 8 which permits the tube to be moved relative to the spring a driving vibration of the tube. The connection between the spring 8 and the tube 6 by means of a fastening device, is such as to prevent any loosening of the tube 6 from the spring 8.

The tube 6 is provided with ribs 16 which, as shown in FIG. 1, terminate short of the lower end of the tube. Thus, said ribs 16 serve to form a stop for the bag 17 to be slipped over the tube from below.

The upper end of the tube 6 is cut off at an angle in accordance with the inclination of the tube in such a manner that the tube rests flat against the aperture 2 of the coffee mill so as to receive the ground material from the mill.

In operation, the first step is to slip a bag over the lower end of the tube 6, with the hammer 14 moved manually to raised position, until said bag abuts the lower ends of the ribs 16. Then the hammer 14 is released and holds the bag in position. After filling the bag, it is held by one hand in its position, and the hammer 14 is raised with the other hand by means of the handle 12 and is then released to knock against the outer wall of the tube 6. This can be repeated several times. As a result of the vibrations thus generated in the tube 6, the coffee particles adhering to the inner wall of the tube 6 come loose and fall into the bag.

Tests have shown that it is possible, by adjusting the span or working length of the springs 8 and 10, to achieve an optimum tube vibration. This is the case when the resonant frequencies of the two oscillating systems are either equal or when one is a multiple of the other.

The tube 6 consists preferably of a transparent or translucent material, such as glass or plastic material, to permit the operator to see whether any coffee particles are still adhering to the inner wall of the tube.

Various changes and modifications may be made without departing from the spirit and scope of the present invention and it is intended that such obvious changes and modifications be embraced by the annexed claims.

Having thus described the invention, what is claimed as new and desired to be secured by Letters Patents is:

1. In combination; a mill for grinding coffee and the like, and a spout construction mounted on the mill, said mill comprising a housing with a discharge opening and said spout construction comprising, support means rigidly connected to said housing, a discharge tube leading downwardly at an angle from said discharge opening for conveying the ground material from the mill, said tube having an aperture in its wall adjacent said discharge opening to receive ground material therefrom, first spring means connected between said support means and said tube resiliently supporting said tube, said tube being at least slightly spaced from said housing to permit the discharge tube to vibrate, a manually operable handle member, second spring means connected between said support means and said handle member resiliently supporting said handle member, and an extension portion on the handle member projecting therefrom towards said discharge tube and adapted for being brought into engagement with the said tube, so that said tube can be set in vibration by manually operating the handle member.

2. The combination according to claim 1, in which said spring means are adjustable in respect of their working length.

3. The combination according to claim 1, in which said extension, when in its rest position, rests against the discharge tube and serves as bag holder.

4. A spout construction for coffee mills and the like, said spout construction comprising; support means adapted for rigid connection to the housing of a mill, an inclined discharge tube carried by the support means, said discharge tube being adapted for having its upper end positioned in closely spaced relation to the discharge opening of the mill to receive ground material therefrom, a first spring resiliently supporting the tube on the support means, a handle member adjacent the tube, a second spring resiliently supporting the handle member on the support means, said handle member on the side thereof toward the tube comprising a projecting hammer element normally engaging said tube so as to serve as means for supporting a bag on the tube for receiving ground material therefrom, said handle member when withdrawn from the tube and then released to cause the hammer element to strike the tube serving to set the tube in vibration to dislodge therefrom any ground material adhering to the inside of the tube.

5. A spout construction for a coffee mill or the like according to claim 4 in which said springs are leaf springs extending substantially parallel to each other.

6. A spout construction for a coffee mill or the like according to claim 4 in which said springs are leaf springs extending substantially parallel to each other and attached to the housing at the same place.

7. A spout construction for a coffee mill or the like according to claim 4 in which said springs are leaf springs extending substantially parallel to each other and attached to the support means at the same place and the periodicity of one vibratory system comprising one of said hammer member and tube together with the said spring connected thereto being equal to or a whole multiple of the periodicity of the other vibratory system comprising the other of said hammer member and tube together with the said spring connected thereto.

References Cited in the file of this patent

UNITED STATES PATENTS 2,622,780     Ackerman _____ Dec. 23, 1952